US012608244B2

(12) United States Patent
Li

(10) Patent No.: US 12,608,244 B2
(45) Date of Patent: Apr. 21, 2026

(54) RESOURCE UTILIZATION IN JOB SCHEDULER SYSTEMS

(71) Applicant: SAP SE, Walldorf (DE)

(72) Inventor: Hui Li, Shanghai (CN)

(73) Assignee: SAP SE, Walldorf (DE)

( * ) Notice: Subject to any disclaimer, the term of this patent is extended or adjusted under 35 U.S.C. 154(b) by 425 days.

(21) Appl. No.: 18/505,204

(22) Filed: Nov. 9, 2023

(65) Prior Publication Data

US 2025/0156246 A1     May 15, 2025

(51) Int. Cl.
G06F 9/52      (2006.01)
G06F 9/48      (2006.01)

(52) U.S. Cl.
CPC .............. G06F 9/52 (2013.01); G06F 9/4881 (2013.01)

(58) Field of Classification Search
None
See application file for complete search history.

(56) References Cited

U.S. PATENT DOCUMENTS

| | | | |
|---|---|---|---|
| 9,201,690 B2 | 12/2015 | Meng et al. | |
| 9,679,010 B2 | 6/2017 | Fu et al. | |
| 10,002,024 B2 | 6/2018 | Balsamo et al. | |
| 10,725,834 B2 * | 7/2020 | Lee .......................... | G06F 9/505 |
| 10,728,317 B1 | 7/2020 | James et al. | |
| 11,153,374 B1 | 10/2021 | Yu et al. | |

| | | | |
|---|---|---|---|
| 11,175,950 B1 * | 11/2021 | Yang ...................... | G06F 9/5038 |
| 2014/0109104 A1 | 4/2014 | Majewski et al. | |
| 2014/0351172 A1 | 11/2014 | Madani et al. | |
| 2015/0355943 A1 * | 12/2015 | Harris ................... | G06F 9/5083 718/104 |
| 2016/0156568 A1 | 6/2016 | Naganuma et al. | |
| 2018/0107513 A1 * | 4/2018 | Devi ...................... | G16H 50/50 |
| 2018/0143852 A1 * | 5/2018 | Ballantyne ............ | G06F 9/5072 |
| 2018/0241811 A1 | 8/2018 | Chen et al. | |
| 2020/0293372 A1 * | 9/2020 | Haprian .............. | G06F 11/3006 |
| 2022/0129745 A1 * | 4/2022 | Wan ...................... | G06F 16/2255 |
| 2022/0171653 A1 | 6/2022 | Rj et al. | |
| 2023/0062402 A1 * | 3/2023 | Suzuki ................... | G06F 9/505 |
| 2024/0069998 A1 * | 2/2024 | Chatterjee ............ | G06F 9/5027 |
| 2024/0193010 A1 * | 6/2024 | Huang ..................... | G06F 9/54 |
| 2025/0328377 A1 * | 10/2025 | Alsop ................... | G06F 9/5038 |

OTHER PUBLICATIONS

U.S. Appl. No. 18/332,860, Li et al., filed Jun. 12, 2023.

* cited by examiner

*Primary Examiner* — Christopher C Harris
(74) *Attorney, Agent, or Firm* — Fish & Richardson P.C.

(57)          ABSTRACT
Methods, systems, and computer-readable storage media for receiving a first set of historical processing data for a first job, the first set of historical processing data including a first value for a first characteristic type and a second value for a second characteristic type, determining a first consumption type for the first job based on the first value and the second value, assigning the first job and a second job to a job tuple in response to determining that the first consumption type of the first job is combinable with a second consumption type of the second job, fetching, by a first job worker, the job tuple from a job queue, and concurrently executing, by the first job worker, the first job and the second job of the job tuple.

20 Claims, 5 Drawing Sheets

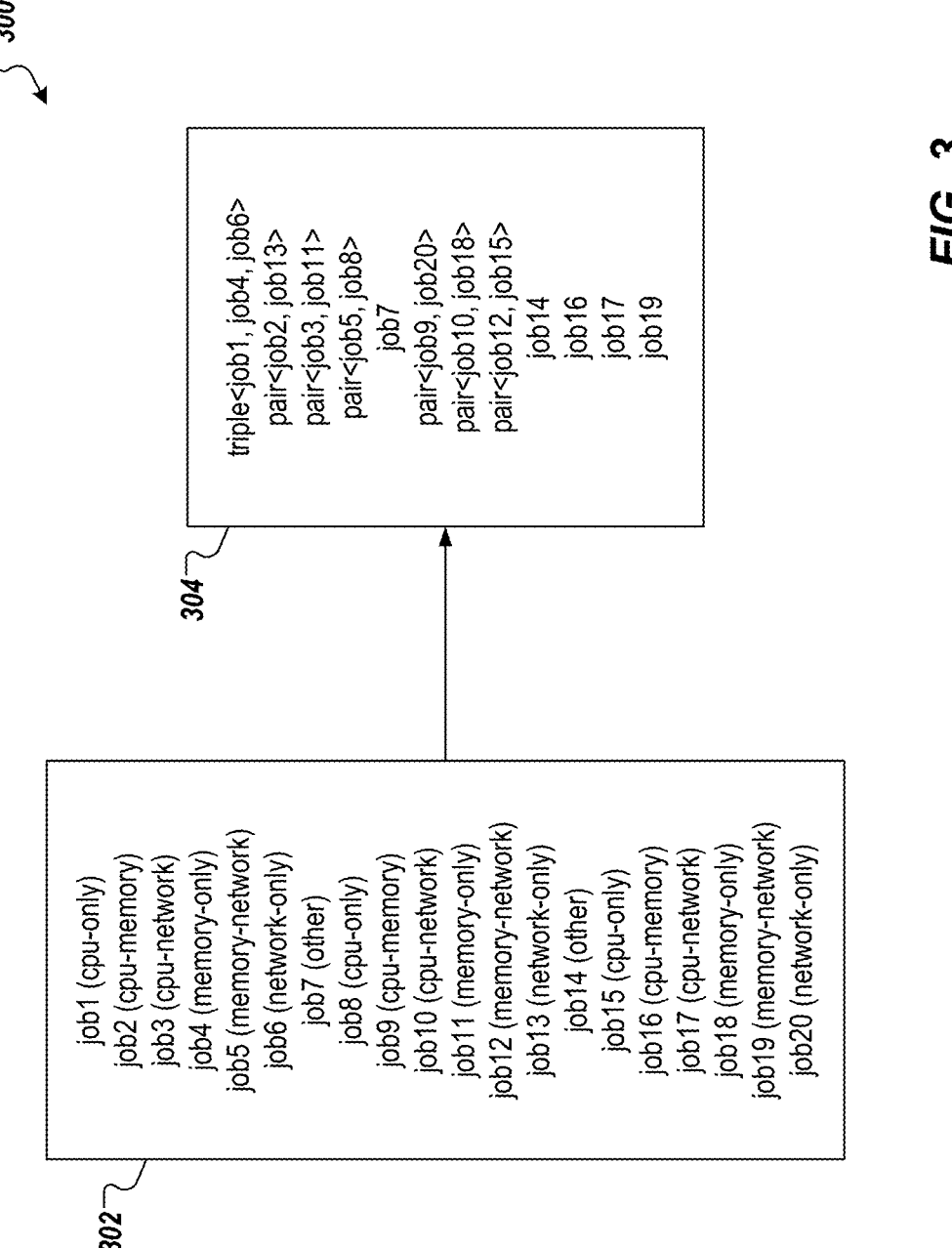

300

304

302 job1 (cpu-only)
job2 (cpu-memory)
job3 (cpu-network)
job4 (memory-only)
job5 (memory-network)
job6 (network-only)
job7 (other)
job8 (cpu-only)
job9 (cpu-memory)
job10 (cpu-network)
job11 (memory-only)
job12 (memory-network)
job13 (network-only)
job14 (other)
job15 (cpu-only)
job16 (cpu-memory)
job17 (cpu-network)
job18 (memory-only)
job19 (memory-network)
job20 (network-only)

triple<job1, job4, job6>
pair<job2, job13>
pair<job3, job11>
pair<job5, job8>
job7
pair<job9, job20>
pair<job10, job18>
pair<job12, job15>
job14
job16
job17
job19

FIG. 3

RESOURCE UTILIZATION IN JOB SCHEDULER SYSTEMS

BACKGROUND

Cloud computing can be described as Internet-based computing that provides shared computer processing resources and data to computers and other devices on demand. Users can establish respective sessions, during which processing resources and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand.

In cloud-based environments, jobs can be periodically performed (e.g., hourly, daily, weekly, monthly) by job workers. A job can be described as a logical container that contains a single task or multiple tasks that are executed towards some end. For example, a job can be executed to perform database administration and/or database maintenance tasks (e.g., backing up, updating statistics, and/or dumping a database). Execution of a job consumes technical resources (e.g., processing, memory, network input/output (I/O)) and different jobs consume different types and/or levels of technical resources. For example, one job can be processor (central processing unit (CPU)) intensive, while another job can be memory intensive. A job scheduler system queues jobs for retrieval by job workers. However, traditional job scheduler systems fail to adequately account for disparities between jobs, which results in inefficient consumption of technical resources across job workers that execute the jobs.

SUMMARY

Implementations of the present disclosure are directed to job scheduler systems. More particularly, implementations of the present disclosure are directed to a job scheduler system that associates jobs with consumption types and selectively groups jobs in a job queue for retrieval by job workers. As described in further detail herein, the job scheduler system improves resource utilization across job workers that execute the jobs.

In some implementations, actions include receiving a first set of historical processing data for a first job, the first set of historical processing data including a first value for a first characteristic type and a second value for a second characteristic type, determining a first consumption type for the first job based on the first value and the second value, assigning the first job and a second job to a job tuple in response to determining that the first consumption type of the first job is combinable with a second consumption type of the second job, fetching, by a first job worker, the job tuple from a job queue, and concurrently executing, by the first job worker, the first job and the second job of the job tuple. Other implementations of this aspect include corresponding systems, apparatus, and computer programs, configured to perform the actions of the methods, encoded on computer storage devices.

These and other implementations can each optionally include one or more of the following features: determining a first consumption type for the first job based on the first value and the second value includes determining that the first value is equal to or above a first threshold value and the second value is less than a second threshold value, and in response, assigning the first consumption type to the first job; determining a first consumption type for the first job based on the first value and the second value includes determining that the first value is equal to or above a first threshold value and the second value is equal to or above a second threshold value, and in response, assigning the first consumption type to the first job; actions further include assigning a third job to be non-concurrently executed by a job worker in response to determining that a first consumption type of the third job is not combinable with consumption types of other jobs, fetching, by a second job worker, the third job from the job queue, and executing, by the second job worker, the third job; the first characteristic type and the second characteristic type are included in a set of characteristic types including processing cost, memory cost, and network cost; the first consumption type and the second consumption type are included in a set of consumption types comprising, processing-only, processing-memory, processing-network, memory-only, memory-network, network-only, and other; and the first job worker fetches the job tuple from the job queue based on a load balancing algorithm that designates an order of job workers for fetching from the job queue.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 3 depicts example job grouping in accordance with implementations of the present disclosure.

Like reference symbols in the various drawings indicate like elements.

DETAILED DESCRIPTION

Figure 1:
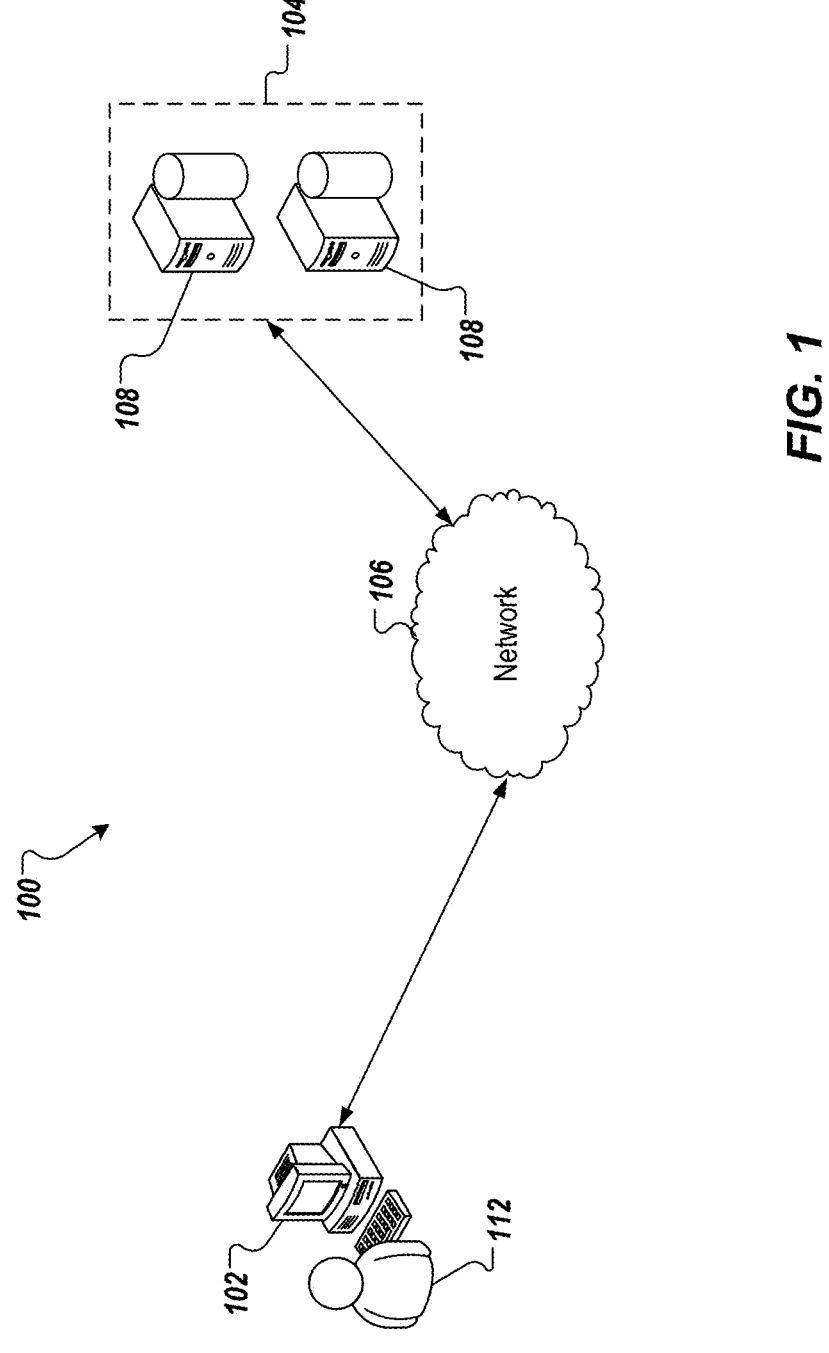
FIG. 1 depicts an example architecture that can be used to execute implementations of the present disclosure.

Implementations of the present disclosure are directed to job scheduler systems. More particularly, implementations of the present disclosure are directed to a job scheduler system that associates jobs with consumption types and selectively groups jobs in a job queue for retrieval by job workers. As described in further detail herein, the job scheduler system improves resource utilization across job workers that execute the jobs. Implementations can include actions of receiving a first set of historical processing data for a first job, the first set of historical processing data including a first value for a first characteristic type and a second value for a second characteristic type, determining a first consumption type for the first job based on the first value and the second value, assigning the first job and a second job to a job tuple in response to determining that the first consumption type of the first job is combinable with a second consumption type of the second job, fetching, by a first job worker, the job tuple from a job queue, and concurrently executing, by the first job worker, the first job and the second job of the job tuple.

To provide further context for implementations of the present disclosure, and as introduced above, cloud computing can be described as Internet-based computing that provides shared computer processing resources and data to computers and other devices on demand. Users can establish respective sessions, during which processing resources and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand.

In cloud-based environments, jobs can be periodically performed (e.g., hourly, daily, weekly, monthly) by job workers. A job can be described as a logical container that contains a single task or multiple tasks that are executed towards some end. For example, a job can be executed to perform database administration and/or database maintenance tasks (e.g., backing up, updating statistics, and/or dumping a database). A job worker (e.g., a program executing on a server) retrieves a job from a job queue and executes the job. Execution of a job consumes technical resources (e.g., processing, memory, network input/output (I/O)) and different jobs consume different types and/or levels of technical resources. For example, jobs can be considered CPU-intensive (consume many CPU resources but few memory/ network resources), memory-intensive (consume many memory resources but few CPU/network resources), and/or network-intensive (consume many network resources but few CPU/memory resources).

A job scheduler system queues jobs in the job queue for retrieval by job workers. Multiple job workers fetch jobs from the job queue based on some load balancing algorithm (e.g., round robin), and each job worker executes a job. However, traditional load balancing approaches fail to account for the technical resources each job will consume. As such, traditional job scheduler systems fail to adequately account for disparities between jobs, which results in inefficient consumption of technical resources across job workers that execute the jobs.

In view of the foregoing, implementations of the present disclosure provide a job scheduler system that improves resource utilization across job workers that execute jobs. As described in further detail herein, the job scheduler system of the present disclosure associates jobs with consumption types and selectively groups jobs in a job queue for retrieval by job workers. In some examples, multiple jobs are grouped into tuples (e.g., pairs, triples) that are executed by job workers. Implementations of the present disclosure leverage the fact that CPU-intensive jobs, memory-intensive jobs, and network-intensive jobs can be executed concurrently (e.g., having at least a partial overlap in time) with little to no detrimental effect on each other. In this manner, implementations of the present disclosure distribute the combinations of CPU-intensive jobs, memory-intensive jobs, network-intensive jobs, CPU-memory-intensive jobs, CPU-network-intensive jobs, and memory-network-intensive jobs to the same job worker and let them execute concurrently. As a result, the resource utilization (CPU, memory, network resources) of the job workers is improved over traditional approaches.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106). In accordance with implementations of the present disclosure, the server system 104 can host job workers and a job scheduler system that improves resource utilization across the job workers as the job workers execute jobs.

Figure 2:
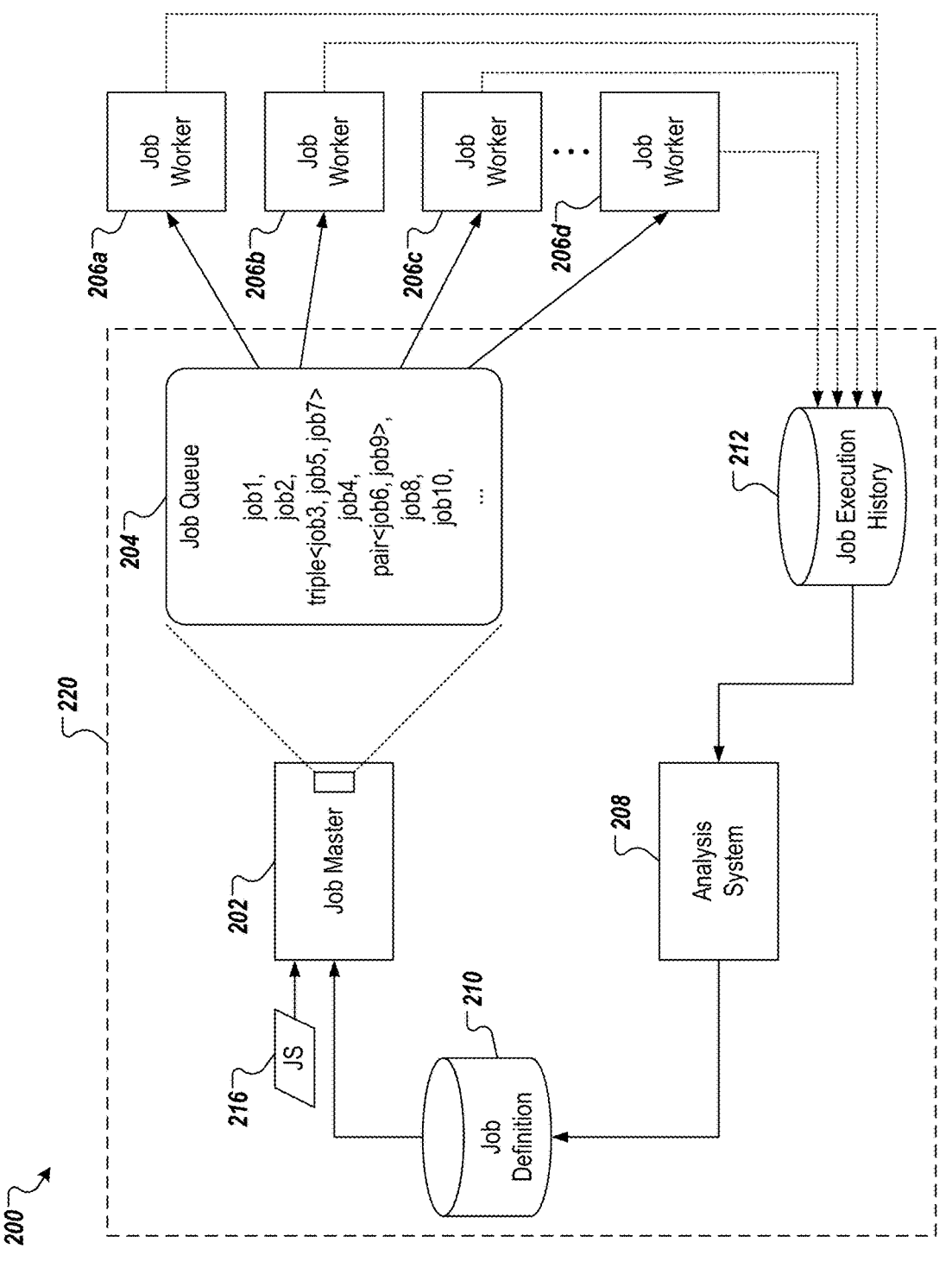
FIG. 2 depicts an example job execution system in accordance with implementations of the present disclosure.

FIG. 2 depicts an example job execution system 200 in accordance with implementations of the present disclosure. In the depicted example, the job execution system 200 includes a job master 202, a job queue 204, job workers 206a, 206b, 206c, 206d, an analysis system 208, a job definition datastore 210, and a job execution history datastore 212. In some examples, components of the job execution system 200 can be included in a job scheduler system 220 of the present disclosure. In the example of FIG. 2, the job scheduler system 220 includes the job master 202, the job queue 204, the analysis system 208, the job definition datastore 210, and the job execution history datastore 212. In some examples, the job master 202 receives a jobs schedule 216 that informs the job master 202 of which jobs are to be executed (e.g., for a particular period of time).

In some implementations, the job definition datastore 210 stores a job definition table that records details of each job that is to be executed by the job execution system 200. Among other details, the job definition table can record, for each job, a job identifier (JOB_ID) and a consumption type (CONSUME_TYPE) that is assigned to a respective job. Example consumption types can include: other, cpu-only, cpu-memory, cpu-network, memory-only, memory-network, and network-only. If a job is new and has not been previously executed by the job execution system 200, the job is assigned "other," or an equivalent, as the consumption type. If a job has been previously executed by the job execution system 200, the consumption type is assigned as described in further detail herein.

In further detail, the job master 202 reads jobs that are to be executed (e.g., for a certain period) from the jobs schedule 216 and retrieves a job definition for each job from the job definition datastore 210. The job master 202 puts the jobs into the job queue 204, and exposes a web service application programming interface (API). In accordance with implementations of the present disclosure, prior to putting jobs in the job queue 204, the job master 202 selectively combines jobs into tuples based on assigned consumption types. More particularly, the job master 202 selectively combines jobs based on a set of combination rules. Example combination rules are provided in Table 1:

TABLE 1

Example Combination Rules

| Combination Type | Combination Jobs Set |
|---|---|
| triple | {1 cpu-only job, 1 memory-only job, 1 network-only job} |
| pair | {1 cpu-only, 1 memory-network job}, or {1 memory-only, 1 cpu-network job}, or {1 network-only, 1 cpu-memory job}, or {1 cpu-only, 1 memory-only job} (when network-only job not found), or {1 cpu-only, 1 network-only job} (when memory-only job not found), or {1 memory-only, 1 network-only job} (when cpu-only job not found) |

For example, if the job master 202 finds some jobs whose consumption types are cpu-only, cpu-memory, cpu-network, memory-only, memory-network, or network-only, the job master 202 will combine them into a tuple (e.g., a pair, a triple). The job master 202 puts the job tuple into the job queue 204 as one element. One of the job workers 206a, 206b, 206c, 206d can fetch a job or a job tuple (containing multiple jobs) from the job queue 204 and executes the job(s). In the case of a job tuple, the job worker 206a, 206b, 206c, 206d executes the multiple jobs of the job tuple concurrently. In the case of a job that is not included in a job tuple, the job worker 206a, 206b, 206c, 206d executes the job non-concurrently. That is, the job worker 206a, 206b, 206c, 206d only executes the job without concurrently executing any other job.

FIG. 3 depicts example job grouping 300 in accordance with implementations of the present disclosure. In the depicted example, the job master 202 reads a job list 302. The job list 302 is a list of jobs that are to be executed (e.g., the job schedule 216 identifying jobs that are to be executed by the job workers 206a, 206b, 206c, 206d). The job master 202 selectively combines jobs according to combination rules (e.g., of Table 2) to provide a combined jobs list 304, which is provided to the job queue 204. In the example of FIG. 3, job1, job4, and job6 are combined into a job triple, because job1 has the consumption type cpu-only, job4 has the consumption type memory-only, and job6 has the consumption type network-only. In the example of FIG. 3, job2 and job13 are combined into a job pair, because job2 has the consumption type cpu-memory and job13 has the consumption type network-only. In the example of FIG. 3, job7 is not combined with any other job, because job7 has the consumption type other (e.g., indicating that job7 has not been previously executed by the job execution system 200).

Referring again to FIG. 2, the job workers 206a, 206b, 206c, 206d each fetch a job or a job tuple from the job queue 204 (e.g., through an API exposed by the job master 202). In some examples, jobs and job tuples are provided to the job workers 206a, 206b, 206c, 206d according to a load balancing algorithm. For example, and with reference to round robin as a non-limiting example, the job worker 206a can fetch a job or job tuple, the job worker 206b can next fetch a job or job tuple, the job worker 206c can next fetch a job or job tuple, the job worker 206d can next fetch a job or job tuple, then the job worker 206a can again fetch a job or job tuple, the job worker 206b can next fetch a job or job tuple, and so on. If a job worker 206a, 206b, 206c, 206d fetches a job, the job worker 206a, 206b, 206c, 206d executes the job. If a job worker 206a, 206b, 206c, 206d fetches a job tuple, the job worker 206a, 206b, 206c, 206d concurrently executes the jobs of the job tuple.

For each successfully executed job, the job worker 206a, 206b, 206c, 206d that executed the job determines a set of job execution metrics, which includes the total execution time (TOTAL_EXEC_TIME), CPU time cost (CPU_TIME), memory cost (MEMORY), network input (NETWORK_IN), and network output (NETWORK_OUT) of the job. Programming languages that can be used for job workers, such as Java, provide interfaces to determine each thread's resource cost, such as CPU time, memory, network input, and network output. As a result, this information is available for the job worker to calculate the metrics of each job. The set of metrics for each job is stored into a database table (JOB_EXEC_HISTORY). In some examples, the database table is stored in the job execution history datastore 212. An example data structure of the database table is provided in Table 2:

TABLE 2

Example Data Structure of Database Table (JOB_EXEC_HISTORY)

| Column | Type | Remark | Example Value |
|---|---|---|---|
| JOB_ID | Number | The identifier of the job. | |
| TIME_STAMP | Timestamp | The timestamp of job execution start. | 2025-07-09T12:44:26 |
| TOTAL_EXEC_TIME | Number | The total execution time of the job. | 1800000 ms |
| CPU_TIME | Number | The CPU time cost of the job. | 900000 ms |
| MEMORY | Number | The memory cost of the job. | 50M |
| NETWORK_IN | Number | The network input cost of the job. | 10M |
| NETWORK_OUT | Number | The network output cost of the job. | 80M |

In accordance with implementations of the present disclosure, the analysis system 208 reads the latest job execution history records from database table to periodically determine the consumption type for each job. The following example relationships can be provided:

$$\overline{CPU} = \frac{1}{N}\sum_{k=1}^{N} CPU\_TIME_k$$

$$\overline{MEM} = \frac{1}{N}\sum_{k=1}^{N} MEMORY_k$$

$$\overline{NET} = \frac{1}{N}\sum_{k=1}^{N} (NETWORK\_IN_k + NETWORK\_OUT_k)$$

The consumption type that is assigned to a job can be determined based on the following example relationships: CONSUME_TYPE $$= \begin{cases} cpu\text{-only}, & \text{if } (\overline{CPU} \geq CPU_{low}) \text{ AND } (\overline{MEM} < MEM_{low}) \text{ AND } (\overline{NET} < NET_{low}) \\ cpu\text{-memory}, & \text{if } (\overline{CPU} \geq CPU_{low}) \text{ AND } (\overline{MEM} \geq MEM_{low}) \text{ AND } (\overline{NET} < NET_{low}) \\ cpu\text{-network}, & \text{if } (\overline{CPU} \geq CPU_{low}) \text{ AND } (\overline{MEM} < MEM_{low}) \text{ AND } (\overline{NET} \geq NET_{low}) \\ memory\text{-only}, & \text{if } (\overline{CPU} < CPU_{low}) \text{ AND } (\overline{MEM} \geq MEM_{low}) \text{ AND } (\overline{NET} < NET_{low}) \\ memory\text{-network}, & \text{if } (\overline{CPU} < CPU_{low}) \text{ AND } (\overline{MEM} \geq MEM_{low}) \text{ AND } (\overline{NET} \geq NET_{low}) \\ network\text{-only}, & \text{if } (\overline{CPU} < CPU_{low}) \text{ AND } (\overline{MEM} < MEM_{low}) \text{ AND } (\overline{NET} \geq NET_{low}) \\ other, & \text{if other conditions} \end{cases}$$

Table 3 provides a summary of the variables included in the above relationships:

TABLE 3

| Summary of Variables. | |
|---|---|
| Variable | Explanation |
| N | The count of execution history records of one job within a sliding window. |
| $CPU\_TIMER_k$ | The CPU time cost of the Kth execution history record of the job |
| $MEMORY_k$ | The memory cost of the Kth execution history record of the job |
| $NETWORK\_IN_k$ | The network input cost of the Kth execution history record of the job |
| $NETWORK\_OUT_k$ | The network output cost of the Kth execution history record of the job |
| $CPU_{low}$ | Positive Cost. The threshold to judge whether a job costs few CPU resources. Can be adjusted. |
| $MEM_{low}$ | Positive Cost. The threshold to judge whether a job costs few memory resources. Can be adjusted. |
| $NET_{low}$ | Positive Cost. The threshold to judge whether a job costs few network resources. Can be adjusted. |

The analysis system 208 updates the consumption type for each job in the job definition table stored in the job definition datastore 210.

Figure 4:
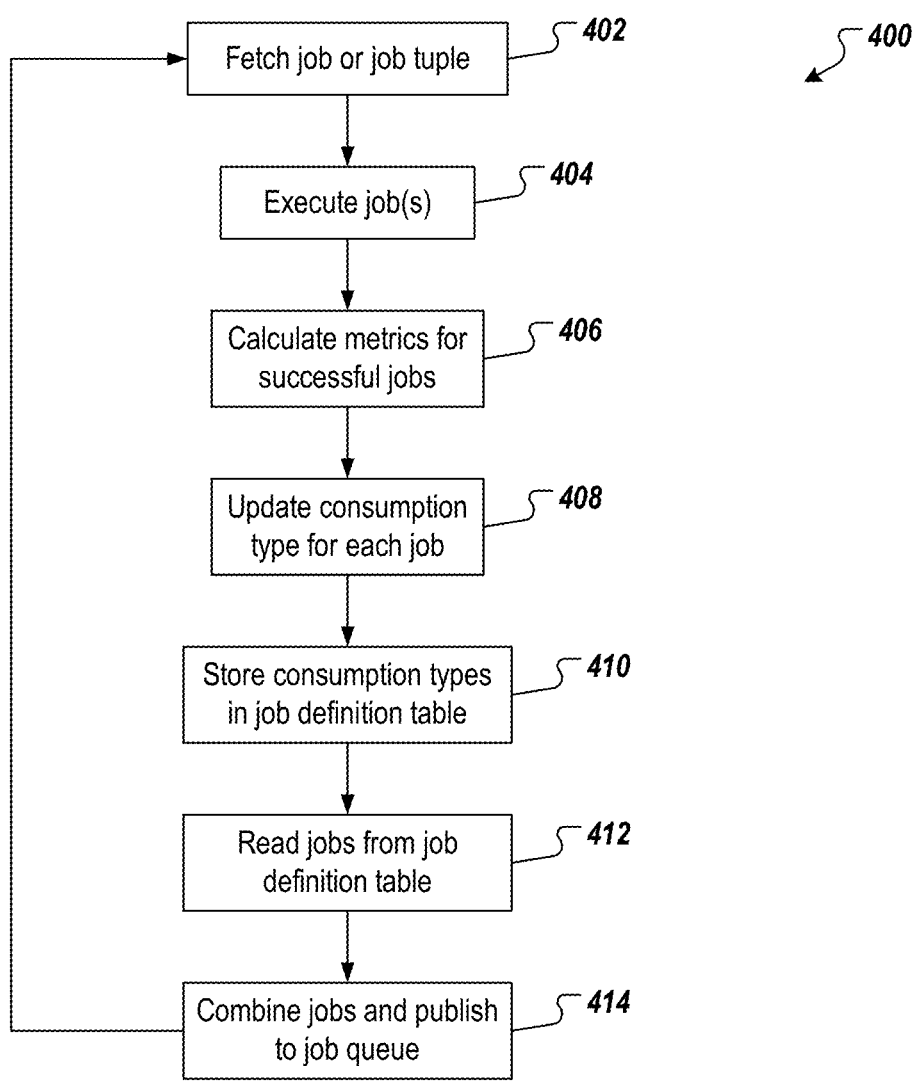
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A job or job tuple is fetched (402). For example, and as described in detail herein with reference to FIG. 2, the job workers 206a, 206b, 206c, 206d each fetch a job or a job tuple from the job queue 204. Fetching can included making a call to the job queue 204 (e.g., through an API) to request one or more jobs. In some examples, jobs and job tuples are provided to the job workers 206a, 206b, 206c, 206d according to a load balancing algorithm (e.g., round robin). The job(s) is/are executed (404). For example, and as described in detail herein, if a job worker 206a, 206b, 206c, 206d fetches a job, the job worker 206a, 206b, 206c, 206d executes the job, and, if a job worker 206a, 206b, 206c, 206d fetches a job tuple, the job worker 206a, 206b, 206c, 206d concurrently executes the jobs of the job tuple. In some examples, execution of a job includes executing one or more tasks to provide a result.

A set of metrics is calculated for each successfully executed job (406). For example, and as described in detail herein, for each successfully executed job, the job worker 206a, 206b, 206c, 206d that executed the job determines a set of job execution metrics, which includes the total execution time (TOTAL_EXEC_TIME), CPU time cost (CPU_TIME), memory cost (MEMORY), network input (NETWORK_IN), and network output (NETWORK_OUT) of the job. A successfully executed job can be described as a job that is completed to produce a respective result. That is, a successfully executed job is a job that does not fail before producing a result. The set of metrics for each job is stored into a database table of the job execution history datastore 212.

A consumption type of each job is updated (408). For example, and as described in detail herein, the analysis system 208 reads the latest job execution history records from the database table to determine the consumption type for each job. Consumption types are stored in a job definition table (410). For example, and as described in detail herein, the analysis system 208 updates the consumption type for each job in the job definition table stored in the job definition datastore 210. Jobs are read from the job definition table (412) and two or more jobs are combined and jobs and job tuples are published to the job queue (414). For example, and as described in detail herein, the job master 202 reads jobs that are to be executed from the job definition datastore 210, selectively combines jobs into tuples based on assigned consumption types using a set of combination rules, and puts jobs and job tuples into the job queue 204. The example process 400 loops back.

Figure 5:
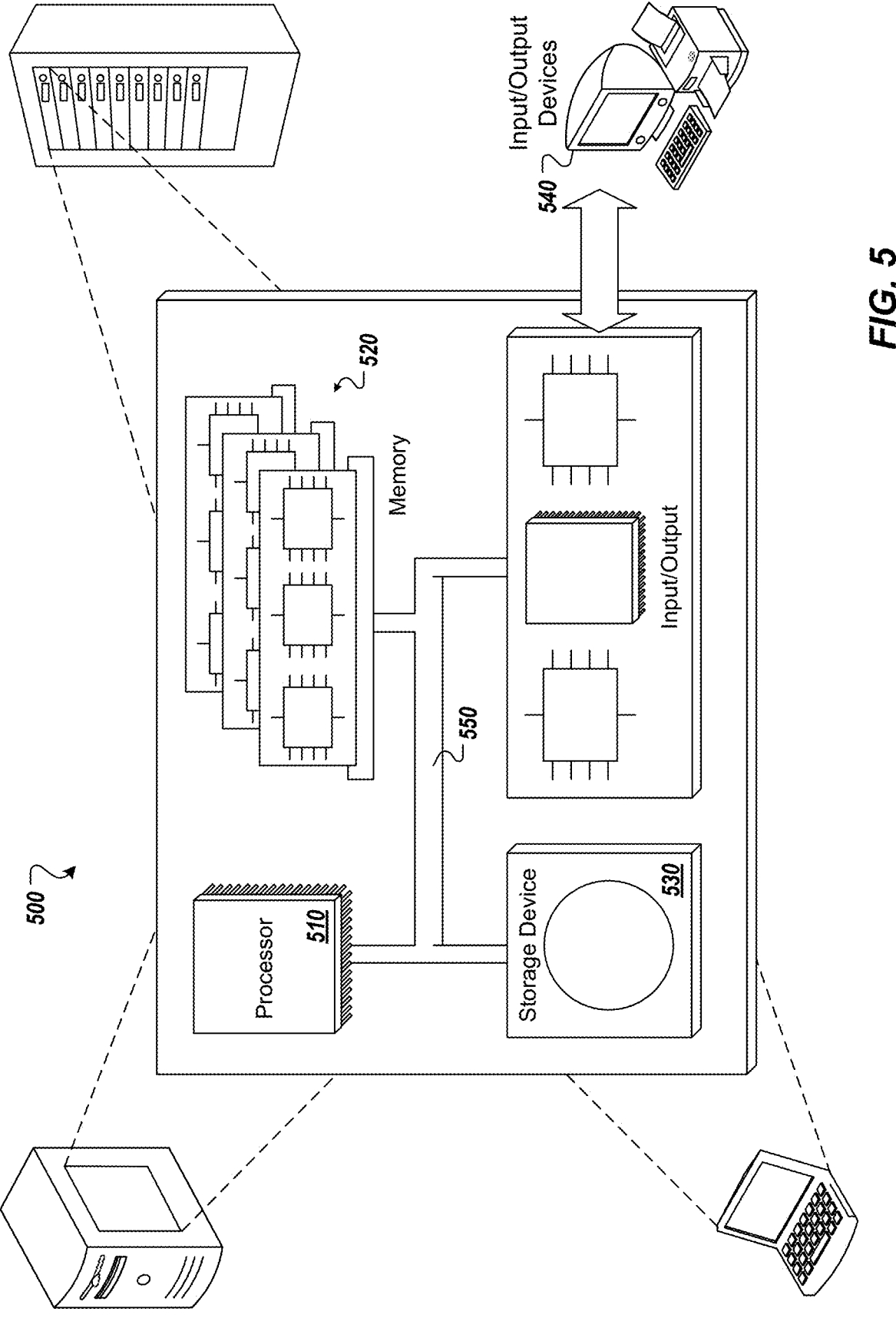
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for distributing jobs for execution in cloud-based environments, the method being executed by one or more processors and comprising:
   receiving a first set of historical processing data for a first job, the first set of historical processing data comprising a first value for a first characteristic type and a second value for a second characteristic type;
   determining a first consumption type for the first job based on the first value and the second value;
   assigning the first job and a second job to a job tuple in response to determining that the first consumption type of the first job is combinable with a second consumption type of the second job;
   fetching, by a first job worker, the job tuple from a job queue; and
   concurrently executing, by the first job worker, the first job and the second job of the job tuple.

2. The method of claim 1, wherein determining a first consumption type for the first job based on the first value and the second value comprises determining that the first value is equal to or above a first threshold value and the second value is less than a second threshold value, and in response, assigning the first consumption type to the first job.

3. The method of claim 1, wherein determining a first consumption type for the first job based on the first value and the second value comprises determining that the first value is equal to or above a first threshold value and the second value is equal to or above a second threshold value, and in response, assigning the first consumption type to the first job.

4. The method of claim 1, further comprising:

assigning a third job to be non-concurrently executed by a job worker in response to determining that a first consumption type of the third job is not combinable with consumption types of other jobs;

fetching, by a second job worker, the third job from the job queue; and executing, by the second job worker, the third job.

5. The method of claim 1, wherein the first characteristic type and the second characteristic type are included in a set of characteristic types comprising processing cost, memory cost, and network cost.

6. The method of claim 1, wherein the first consumption type and the second consumption type are included in a set of consumption types comprising, processing-only, processing-memory, processing-network, memory-only, memory-network, network-only, and other.

7. The method of claim 1, wherein the first job worker fetches the job tuple from the job queue based on a load balancing algorithm that designates an order of job workers for fetching from the job queue.

8. A non-transitory computer-readable storage medium coupled to one or more processors and having instructions stored thereon which, when executed by the one or more processors, cause the one or more processors to perform operations for distributing jobs for execution in cloud-based environments, the operations comprising:

receiving a first set of historical processing data for a first job, the first set of historical processing data comprising a first value for a first characteristic type and a second value for a second characteristic type;

determining a first consumption type for the first job based on the first value and the second value;

assigning the first job and a second job to a job tuple in response to determining that the first consumption type of the first job is combinable with a second consumption type of the second job;

fetching, by a first job worker, the job tuple from a job queue; and concurrently executing, by the first job worker, the first job and the second job of the job tuple.

9. The non-transitory computer-readable storage medium of claim 8, wherein determining a first consumption type for the first job based on the first value and the second value comprises determining that the first value is equal to or above a first threshold value and the second value is less than a second threshold value, and in response, assigning the first consumption type to the first job.

10. The non-transitory computer-readable storage medium of claim 8, wherein determining a first consumption type for the first job based on the first value and the second value comprises determining that the first value is equal to or above a first threshold value and the second value is equal to or above a second threshold value, and in response, assigning the first consumption type to the first job.

11. The non-transitory computer-readable storage medium of claim 8, wherein operations further comprise:

assigning a third job to be non-concurrently executed by a job worker in response to determining that a first consumption type of the third job is not combinable with consumption types of other jobs;

fetching, by a second job worker, the third job from the job queue; and executing, by the second job worker, the third job.

12. The non-transitory computer-readable storage medium of claim 8, wherein the first characteristic type and the second characteristic type are included in a set of characteristic types comprising processing cost, memory cost, and network cost.

13. The non-transitory computer-readable storage medium of claim 8, wherein the first consumption type and the second consumption type are included in a set of consumption types comprising, processing-only, processing-memory, processing-network, memory-only, memory-network, network-only, and other.

14. The non-transitory computer-readable storage medium of claim 8, wherein the first job worker fetches the job tuple from the job queue based on a load balancing algorithm that designates an order of job workers for fetching from the job queue.

15. A system, comprising:

a computing device; and a computer-readable storage device coupled to the computing device and having instructions stored thereon which, when executed by the computing device, cause the computing device to perform operations for distributing jobs for execution in cloud-based environments, the operations comprising:

receiving a first set of historical processing data for a first job, the first set of historical processing data comprising a first value for a first characteristic type and a second value for a second characteristic type;

determining a first consumption type for the first job based on the first value and the second value;

assigning the first job and a second job to a job tuple in response to determining that the first consumption type of the first job is combinable with a second consumption type of the second job;

fetching, by a first job worker, the job tuple from a job queue; and concurrently executing, by the first job worker, the first job and the second job of the job tuple.

16. The system of claim 15, wherein determining a first consumption type for the first job based on the first value and the second value comprises determining that the first value is equal to or above a first threshold value and the second value is less than a second threshold value, and in response, assigning the first consumption type to the first job.

17. The system of claim 15, wherein determining a first consumption type for the first job based on the first value and the second value comprises determining that the first value is equal to or above a first threshold value and the second value is equal to or above a second threshold value, and in response, assigning the first consumption type to the first job.

18. The system of claim 15, wherein operations further comprise:

assigning a third job to be non-concurrently executed by a job worker in response to determining that a first consumption type of the third job is not combinable with consumption types of other jobs;

fetching, by a second job worker, the third job from the job queue; and executing, by the second job worker, the third job.

19. The system of claim 15, wherein the first characteristic type and the second characteristic type are included in a set of characteristic types comprising processing cost, memory cost, and network cost.

20. The system of claim 15, wherein the first consumption type and the second consumption type are included in a set of consumption types comprising, processing-only, processing-memory, processing-network, memory-only, memory-network, network-only, and other.

\* \* \* \* \*